United States Patent
Maloum et al.

(10) Patent No.: US 9,608,553 B2
(45) Date of Patent: Mar. 28, 2017

(54) METHOD AND DEVICE FOR CONTROLLING AN ELECTRIC MOTOR PROPULSION UNIT WITH DECOUPLED CONTROLS

(75) Inventors: Abdelmalek Maloum, Chevilly Larue (FR); Ahmed Ketfi-Cherif, Elancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 222 days.

(21) Appl. No.: 14/126,659

(22) PCT Filed: Jun. 7, 2012

(86) PCT No.: PCT/FR2012/051277
§ 371 (c)(1),
(2), (4) Date: Jan. 15, 2014

(87) PCT Pub. No.: WO2012/172237
PCT Pub. Date: Dec. 20, 2012

(65) Prior Publication Data
US 2014/0132196 A1   May 15, 2014

(30) Foreign Application Priority Data

Jun. 15, 2011  (FR) ...................... 11 55219

(51) Int. Cl.
*H02P 1/46* (2006.01)
*H02P 25/02* (2016.01)
(Continued)

(52) U.S. Cl.
CPC ........ *H02P 25/021* (2013.01); *H02P 21/0003* (2013.01); *H02P 21/06* (2013.01);
(Continued)

(58) Field of Classification Search
CPC .. H02P 21/0035; H02P 2205/01; H02P 23/12; H02P 25/02; H02P 25/021; H02P 21/0003; H02P 25/0925; A61F 2/68
(Continued)

(56) References Cited

U.S. PATENT DOCUMENTS

| 4,726,738 A * | 2/1988 | Nakamura ............ F04B 49/065 |
| | | 318/432 |
| 5,949,210 A | 9/1999 | Gataric et al. |

(Continued)

FOREIGN PATENT DOCUMENTS

| EP | 0 798 848 A1 | 10/1997 |
| EP | 0 943 481 A2 | 9/1999 |

(Continued)

OTHER PUBLICATIONS

International Search Report issued Aug. 3, 2012 in PCT/FR2012/051277.

(Continued)

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

A method of controlling an electric motor including a rotor and a stator, sensors for measuring currents flowing in the rotor and in the stator, a mechanism determining setpoints of current, and a mechanism processing the signals from the measurement sensors, the method including: determining intermediate signals by a transformation according to which stator voltages and rotor voltages of the electric motor are expressed in a decoupled reference system as a function of the signals received from the processing means, and determining signals for regulating voltage as a function of the currents flowing in the rotor and in the stator of the electric (Continued)

Figure 1:
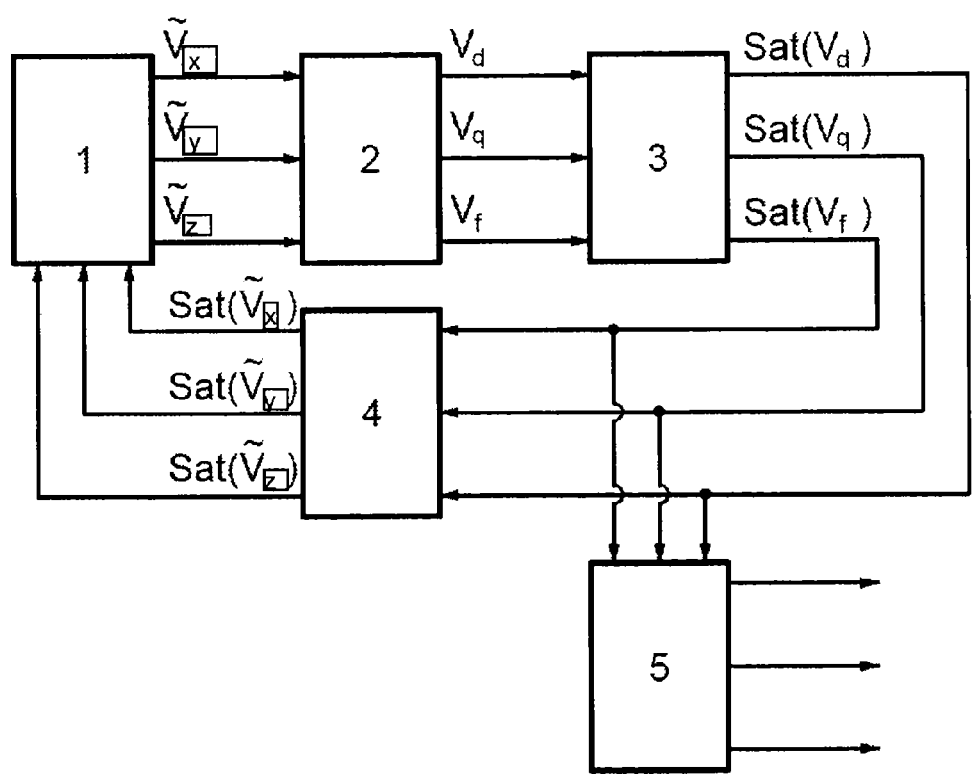

motor satisfying the setpoints of current as a function of the intermediate signals obtained by transformation.

9 Claims, 2 Drawing Sheets

(51) Int. Cl.
*H02P 21/00* (2016.01)
*H02P 21/06* (2016.01)
*H02P 21/22* (2016.01)
*H02P 25/024* (2016.01)

(52) U.S. Cl.
CPC .............. *H02P 21/22* (2016.02); *H02P 25/02* (2013.01); *H02P 25/024* (2016.02); *Y02T 10/7258* (2013.01)

(58) Field of Classification Search
USPC .......... 318/717, 567, 568.1, 568.12, 568.16, 318/568.19, 615, 656, 400.02, 400.21, 318/400.22, 432, 434
See application file for complete search history.

(56) References Cited

U.S. PATENT DOCUMENTS

| | | | |
|---|---|---|---|
| 5,955,863 A | 9/1999 | Iwashita et al. | |
| 6,069,467 A * | 5/2000 | Jansen | H02P 6/183 318/801 |
| 6,407,531 B1 * | 6/2002 | Walters | H02P 6/085 318/805 |
| 6,703,809 B2 * | 3/2004 | Royak | H02P 21/141 318/727 |
| 6,984,957 B2 * | 1/2006 | Tajima | B60K 6/26 318/400.02 |
| 7,015,667 B2 * | 3/2006 | Patel | H02P 21/08 318/432 |
| 7,276,877 B2 * | 10/2007 | Qiu | H02P 21/13 318/453 |
| 7,348,749 B2 * | 3/2008 | Ide | H02P 21/141 318/599 |
| 8,207,701 B2 * | 6/2012 | Tang | G01D 21/00 318/808 |
| 8,508,179 B2 * | 8/2013 | Schmidt | H02P 1/46 318/716 |
| 8,963,461 B2 * | 2/2015 | Arima | H02P 21/0096 318/400.02 |
| 9,018,881 B2 * | 4/2015 | Mao | H02P 29/0241 318/400.01 |
| 9,035,581 B2 * | 5/2015 | Hirono | H02P 6/182 318/400.02 |
| 9,407,188 B2 * | 8/2016 | Yoo | H02P 21/0017 |
| 2002/0175649 A1 * | 11/2002 | Reutlinger | H02P 9/305 318/609 |

FOREIGN PATENT DOCUMENTS

| | | |
|---|---|---|
| EP | 1 187 307 A2 | 3/2002 |
| JP | 08-242600 A | 9/1996 |
| JP | 9-327200 A | 12/1997 |

OTHER PUBLICATIONS

Search Report issued Nov. 11, 2011 in French Patent Application No. 11-55219.

\* cited by examiner

METHOD AND DEVICE FOR CONTROLLING AN ELECTRIC MOTOR PROPULSION UNIT WITH DECOUPLED CONTROLS

The technical sector of the invention is the control of electric motors, and in particular the sector of electric motors of wound rotor synchronous type.

An electric motor of wound rotor synchronous type comprises a fixed part called the stator and a moving part called the rotor. The stator comprises three coils offset by 120° and supplied with alternating current. The rotor comprises a coil supplied with direct current.

The currents of the phases of the stator depend on the resistances and inductances of the rotor and the stator as well as the mutual inductance between the rotor and the stator.

An aim of the present invention is to improve the quality of regulation of the currents of an electric motor of wound rotor synchronous type, that a regulator of the prior art can achieve.

According to one mode of implementation, there is defined a method for control of a system comprising an electric motor furnished with a rotor and a stator, sensors for measuring the currents flowing in the rotor and in the stator, means for determining setpoints of current and means for processing the signals arising from the measurement sensors, characterized by the fact that it comprises steps in the course of which:

intermediate signals are determined by a transformation according to which stator and rotor voltages of the electric motor are expressed in a decoupled reference frame as a function of the signals received from the processing means, and signals for regulating voltage as a function of the currents flowing in the rotor and in the stator of the electric motor satisfying the setpoints of current are determined as a function of the intermediate signals obtained by transformation. The setpoints of current are representative of a torque setpoint.

The advantage of the control method is a total decoupling between the variations of the rotor current and the variations of the stator current allowing improved wheel torque setpoint tracking.

This decoupling is much less complex than the decoupling performed in conventional coupling compensation devices working in the Park frame of reference.

The control method can comprise a step in which the voltage regulation signals are saturated so as to satisfy the constraints related to a battery fitted to an automotive vehicle and connected to the electric motor.

The control method can comprise a step in which integration limits are determined by applying an inverse transformation to said saturated voltage regulation signals, the integration limits being applied to the determination of new intermediate signals after said inverse transformation.

The control method can comprise a step in which the continuity of the controls is ensured by limiting the variations of the controls actually transmitted to the actuators.

According to another mode of implementation, there is defined a system for control of an electric motor furnished with a rotor and a stator, comprising sensors for measuring currents flowing in the rotor and in the stator and means for determining setpoints of current, characterized by the fact that it comprises:

a means for processing measurements and requests which is connected at input to the measurement sensors and to the means for determining setpoints of current, a transformation means providing intermediate signals after a transformation according to which stator and rotor voltages of the electric motor are expressed in a decoupled reference frame, connected at input to the means for processing measurements and requests, a determination means connected at input to the transformation means, the determination means being able to emit signals for voltage regulation of the electric motor satisfying the setpoints of current.

The control system can comprise a saturator of the voltage regulation signals received from the determination means.

The control system can comprise a means of inverse transformation of the saturated voltage regulation signals received from the saturator.

The control system can comprise a means for processing the outputs of the saturated voltage regulation signals received from the saturator.

Figure 2:
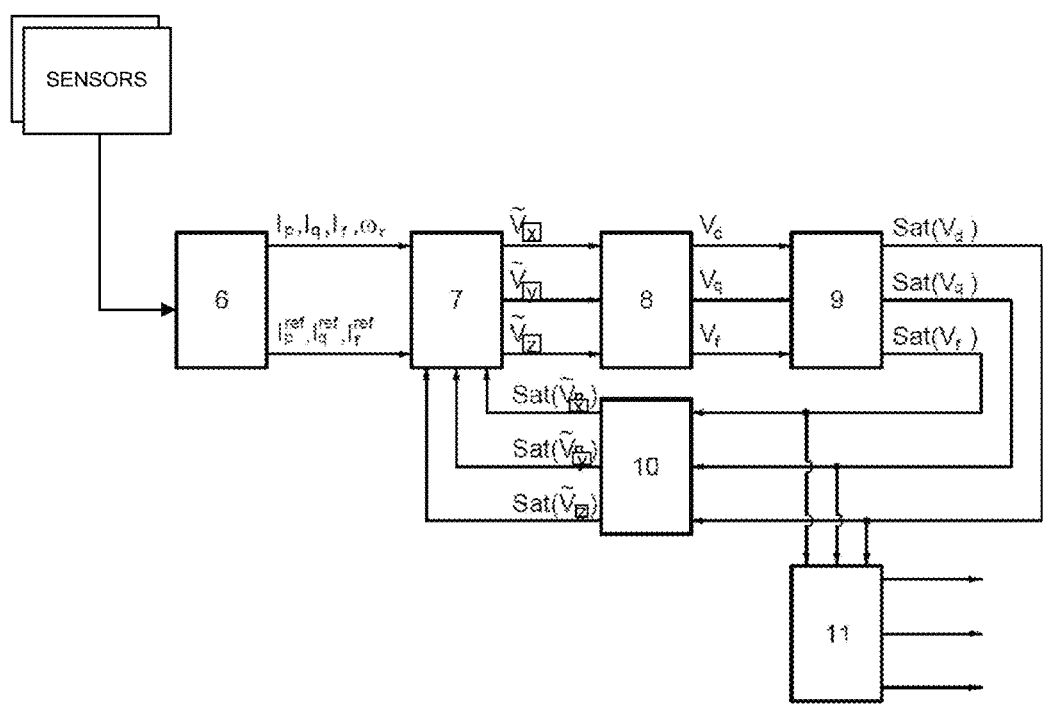

Other aims, characteristics and advantages will become apparent on reading the following description given solely by way of nonlimiting example and with reference to the appended drawings in which:

FIG. 1 illustrates a method for control of an electric motor propulsion unit, and FIG. 2 illustrates a device for control of an electric motor propulsion unit.

The regulation of the currents of a wound rotor synchronous motor presents difficulties on account of the synchronizing of the sinusoidal currents of the stator with the rotation of the motor and dynamic coupling between the rotor and the stator.

Accordingly, use is made of an inverter making it possible to control the voltage of the phases of the stator and of a chopper to control the voltage of the rotor.

Rather than using sinusoidal setpoints, the Park transform is used so as to be able to regulate constant signals. The stator regulation signals in the Park frame of reference are denoted $V_d$, $V_q$. The rotor regulation signal is denoted $V_f$.

In a known manner, we have the following equalities:

$$\tilde{V}_d = R_s I_d + L_d \frac{dI_d}{dt} - \omega_r L_q I_q \qquad (\text{Eq. 1})$$

$$\tilde{V}_q = R_s I_q + L_q \frac{dI_q}{dt} + \omega_r (L_d I_d + M_f I_f)$$

$$\tilde{V}_f = R_f I_f + L_f \frac{dI_f}{dt} - \frac{3M_f}{2L_d}(R_s I_d - \omega_r L_q I_q)$$

In equations (I) and (III), it is clearly noted that:

Vd depends on the variation of current $I_d$, the variation of current $i_f$ (dynamic coupling), and the currents $i_d$ and $I_q$ Vf depends on the variation of current $I_d$, the variation of current $i_f$ (dynamic coupling), and the current $i_f$.

The dependence of Vd and of Vf on these variations of currents (dynamic coupling) is detrimental from a control point of view—since a variation of Vd or of Vf will cause a variation in the current $I_d$ and in the current $I_f$, thus rendering their control coupled.

In order to circumvent this dynamic coupling between the variation of current $I_d$ and the variation of current $I_f$, a change of variables is performed, so as to express the stator and rotor voltages in a decoupled reference frame, that is to say one in which the variation of the current $I_i$ depends only on a single voltage $\tilde{V}_j$, with i an index equal to d, q or f and j an index equal to x, y or z.

After this change of variables: $(\tilde{V}_x, \tilde{V}_y, \tilde{V}_z) = f(V_d, V_q, V_f)$, the system to be controlled can then be represented by the following equations:

$$\tilde{V}_x = R_s I_d + L_d \frac{dI_d}{dt} - \omega_r L_q I_q \quad \text{(Eq. 1)}$$

$$\tilde{V}_y = R_s I_q + L_q \frac{dI_q}{dt} + \omega_r (L_d I_d + M_f I_f)$$

$$\tilde{V}_z = R_f I_f + L_f \frac{dI_f}{dt} - \frac{3M_f}{2L_d}(R_s I_d - \omega_r L_q I_q)$$

With:

$\tilde{V}_x$: New stator voltage in the decoupled reference frame of the d axis $\tilde{V}_y$: New stator voltage in the decoupled reference frame of the q axis.

$\tilde{V}_z$: New rotor voltage in the decoupled reference frame of the f axis.

$L_d$: Equivalent armature inductance on the d axis, that is to say on the polar axis of the Park frame of reference.

$L_q$: Equivalent armature inductance on the q axis, that is to say on the interpolar or transverse axis of the Park frame of reference.

$L_f$: Rotor inductance.

$R_s$: Equivalent resistance of stator windings.

$R_f$: Rotor resistance.

$M_f$: Mutual inductance between the stator and the rotor.

$I_d$: Stator current on the d axis, that is to say on the polar axis of the Park frame of reference.

$I_q$: Stator current on the q axis, that is to say on the interpolar or transverse axis of the Park frame of reference.

$I_f$: Rotor current.

$\omega_r$: Rotation speed.

The values $L_d$, $L_q$, $L_f$, $R_s$, $R_f$ and $M_f$ are known through prior measurements.

The main difficulties presented by this type of system reside in the dynamic coupling between the d and f axes, the difficult to identify variation of the parameters, and finally the voltage constraints of the supply battery.

The voltage constraints are the following:

$$V_d^2 + V_q^2 \leq \frac{V_{bat}^2}{3} \quad \text{(Eq. 2)}$$

$$0 \leq V_f \leq V_{bat}$$

With $V_{bat}$: the battery voltage

The control method illustrated in FIG. 1 makes it possible to control the currents $I_d$, $I_q$ and $I_f$ so as to satisfy the wheel torque demands. Accordingly, filtered and scaled measurements as well as reference setpoints in terms of current (which are representative of the torque setpoint) that the regulator must attain are available.

In a first step 1, in the decoupled reference frame, the synthesis of the regulator is carried out, this being of the following form:

$\tilde{V}_x = K_d(I_d^{ref} - I_d) + K_{id}(I_d^{ref} - I_d)$ $\tilde{V}_y = K_q(I_f - I_q) + K_j(I_f - I_q)$ $\tilde{V}_z = K_f(I_f^{ref} - I_f) + K_{if}(I_f^{ref} - I_f) \quad \text{(Eq. 3)}$ With $I_d^{ref}$: the reference stator current on the d axis.

$I_q^{ref}$: the reference stator current on the q axis.

$I_f^{ref}$: the reference rotor current $K_d$, $K_q$, $K_f$, $K_{id}$, $K_{iq}$, $K_{if}$: adjustment parameters.

The synthesis of the regulator is therefore performed in the decoupled reference frame and not in the Park reference frame.

The currents $V_d^{ref}$, $I_q^{ref}$, $I_f^{ref}$ are setpoint currents, arising from the processing means 6. The equality (Eq. 1)=(Eq. 3) makes it possible to determine the adjustment parameters $K_d$, $K_q$, $K_f$, $K_{id}$, $K_{iq}$, $K_{if}$.

As may be seen, the regulator makes it possible to determine a voltage along an axis x ($\tilde{V}_x$) dependent only on the variations of current of the d axis (1a). Likewise, the voltage along an axis y ($\tilde{V}_y$) and the voltage along an axis z ($\tilde{V}_z$) depend respectively only on the variations of current of the q axis ($I_q$) and of the rotor ($I_f$). The couplings are therefore minimized at the level of the regulator.

The voltage signals expressed in this new base $\tilde{V}_x$, $\tilde{V}_y$, $\tilde{V}_z$ are intermediate signals. In order to have access to the real values, an inverse transformation is necessary. Accordingly, in the course of a second step 2, the voltage regulation signals actually applied to the system are calculated:

$$V_d = \tilde{V}_x + \frac{M_f}{L_d}\left(\tilde{V}_z - R_f I_f + \frac{3M_f}{2L_d}(R_s I_d - \omega_r L_q I_q)\right) \quad \text{(Eq. 4)}$$

$$V_q = \tilde{V}_y$$

$$V_f = \tilde{V}_z + \frac{3M_f}{2L_d}\tilde{V}_x$$

The voltage regulation signals Vd, Vq, Vf are thus determined as a function of the intermediate signals, values of the physical parameters of the motor (inductances, resistances, etc.) and currents flowing in the motor ($I_d$, $I_q$, $I_f$).

In a third step 3, the voltage regulation signals calculated in the second step are saturated so as to satisfy the constraints related to the battery (by satisfying equation 2).

In a fourth step 4, integration limits are determined by inverting the saturated regulation signals calculated in the third step by applying a matrix which is inverted with respect to the matrix of equation 4. The integration limits are thus expressed in the formalism of the decoupled reference frame $\tilde{V}_x$, $\tilde{V}_y$, $\tilde{V}_z$. The integration limits are thereafter taken into account at the level of step 1 so as to limit the integrations of the second terms of equation 3. The integrations are halted when the values $\tilde{V}_x$, $\tilde{V}_y$, $\tilde{V}_z$ exceed the saturated values of $\tilde{V}_x$, $\tilde{V}_y$, $\tilde{V}_z$ obtained in step 4.

A fifth step 5 ensures the continuity of the controls by limiting their variations. After step 5, the values of simple sinusoidal voltages U, V, W are calculated (inverse Park transform) and serve as voltages to be applied to the real system.

The control method obtained is efficacious from a reliability point of view and robust in relation to disturbances.

In FIG. 2 may be seen a control device comprising a means 6 for processing measurements and requests which is able to filter and scale signals received from sensors, for example from sensors of the currents $I_d$, $I_q$ and $I_f$.

The processing means 6 is linked at output to the transformation means 7 making it possible to determine the signals $\tilde{V}_x$, $\tilde{V}_y$, $\tilde{V}_z$, that is to say the intermediate signals. The transformation means 7 applies equation 3 and equation 1.

The transformation means 7 is linked at output to a determination means 8 able to determine the voltage regulation signals $V_d$, $V_q$, $V_f$ as a function of the intermediate signals $\tilde{V}_x$, $\tilde{V}_y$, $\tilde{V}_z$. The determination means 8 applies equation 4.

The determination means 8 is linked at output to a saturator 9 which is able to limit the voltage regulation signals $V_d$, $V_q$, $V_f$ as a function of equation 2.

The saturator 9 is linked at output to an inversion means 10 and to a means for processing the outputs 11.

The inversion means 10 is able to determine saturated intermediate signals as a function of the saturated voltage regulation signals received from the saturator 9. Accordingly, the inversion means 10 applies a matrix which is the inverse of the matrix of equation 4. The saturated intermediate signals are thereafter transmitted to the transformation means 7.

The means for processing the outputs 11 is able to limit the variation of the saturated voltage regulation signals transmitted to the actuators between two calculation cycles in such a way that the mechanical stresses and operating jolts are limited.

The invention claimed is:

1. A method for regulating voltages of an electric motor including a rotor and a stator, and sensors, the method comprising:
    measuring, via sensors, currents flowing in the rotor and in the stator;
    determining setpoints of current;
    processing, via processing means, signals based on the currents and setpoints;
    determining intermediate signals by a transformation according to which stator and rotor voltages are expressed in a decoupled reference frame as a function of the processed signals, wherein a variation of a current Id, Iq or If depends only on a voltage on a single axis of the decoupled reference frame, Id being the stator current on the polar axis of Park's transform domain, Iq being the stator current on the interpolar axis of the Park's transform domain and if being the rotor current; and
    determining signals for regulating voltage based on an inverse transformation as a function of the currents flowing in the rotor and in the stator of the electric motor satisfying the setpoints of current as a function of the intermediate signals obtained by transformation in the decoupled reference frame.

2. The control method as claimed in claim 1, further comprising:
    saturating the voltage regulation signals to satisfy constraints related to a battery fitted to an automotive vehicle and connected to the electric motor.

3. The control method as claimed in claim 2, further comprising:
    determining integration limits by applying an inverse transformation to the saturated voltage regulation signals, the integration limits being applied to the determination of new intermediate signals after the inverse transformation.

4. The control method as claimed in claim 3, further comprising:
    ensuring continuity of controls by limiting variations of the controls.

5. The method of claim 1, wherein the signals for regulating voltage are determined by:

$$V_d = \tilde{V}_x + \frac{M_f}{L_d}\left(\tilde{V}_z - R_f I_f + \frac{3M_f}{2L_d}(R_s I_d - \omega_r L_q I_q)\right)$$

$$V_q = \tilde{V}_y$$

$$V_f = \tilde{V}_z + \frac{3M_f}{2L_d}\tilde{V}_x$$

where $V_d$ is a voltage regulation signal,
where $V_q$ is a voltage regulation signal,
where $V_f$ is a voltage regulation signal,
where $\tilde{V}_x$ is a new stator voltage in the decoupled reference frame of the d axis,
where $M_f$ is a mutual inductance between the stator and the rotor,
where $L_d$ is equivalent armature inductance,
where $\tilde{V}_z$ is a new rotor voltage in the decoupled reference frame,
where $R_f$ is rotor resistance,
where $R_s$ is equivalent resistance of stator windings,
where $\omega_r$ is rotation speed,
where $L_q$ is equivalent armature inductance,
where $I_q$ is stator current,
where $\tilde{V}_y$ is a new stator voltage in the decoupled reference frame, and
where $L_f$ is rotor inductance.

6. A system for control of an electric motor including a rotor and a stator, comprising:
    sensors for measuring currents flowing in the rotor and in the stator;
    processing means configured to
        determine setpoints of current;
        process signals based on the measurements and setpoints;
        determine intermediate signals by a transformation according to which stator and rotor voltages are expressed in a decoupled reference frame as a function of the processed signals, wherein a variation of a current Id, Iq or If depends only on a voltage on a single axis of the decoupled reference frame, Id being the stator current on the polar axis of Park's transform domain, Iq being the stator current on the interpolar axis of the Park's transform domain and If being the rotor current; and
        determine signals for regulating voltage based on an inverse transformation as a function of the currents flowing in the rotor and in the stator of the electric motor satisfying the setpoints of current as a function of the intermediate signals obtained by transformation in the decoupled reference frame.

7. The control system as claimed in claim 6, further comprising:
    a saturator of the received voltage regulation signals.

8. The control system as claimed in claim 7, wherein inversion transformation of the saturated voltage regulation signals is performed.

9. The control system as claimed in claim 8, wherein the outputs of the saturated voltage regulation signals are processed.

* * * * *